US012637294B2

(12) United States Patent
    Williams

(10) Patent No.: US 12,637,294 B2
(45) Date of Patent: May 26, 2026

(54) EXTERNAL BEARING SYSTEMS

(71) Applicant: Cambelt International LLC, Salt Lake City, UT (US)

(72) Inventor: Venny Williams, Salt Lake City, UT (US)

(73) Assignee: Cambelt International LLC, Salt Lake City, UT (US)

( * ) Notice: Subject to any disclaimer, the term of this patent is extended or adjusted under 35 U.S.C. 154(b) by 170 days.

(21) Appl. No.: 18/609,212

(22) Filed: Mar. 19, 2024

(65) Prior Publication Data

US 2024/0317503 A1 Sep. 26, 2024

Related U.S. Application Data

(60) Provisional application No. 63/491,842, filed on Mar. 23, 2023.

(51) Int. Cl.
B65G 23/44 (2006.01)
(52) U.S. Cl.
CPC ................................... B65G 23/44 (2013.01)
(58) Field of Classification Search
CPC ....... B65G 23/44; F16C 2326/58; F16C 23/06
USPC ................................................ 198/813–816
See application file for complete search history.

(56) References Cited

U.S. PATENT DOCUMENTS

| | | | | | |
|---|---|---|---|---|---|
| 853,443 | A | * | 5/1907 | Cunningham | ......... B65G 23/44 |
| | | | | | 384/417 |
| 1,391,703 | A | * | 9/1921 | Sturtevant | .............. B65G 23/44 |
| | | | | | 198/813 |

| | | | | | |
|---|---|---|---|---|---|
| 1,391,704 | A | * | 9/1921 | Sturtevant | .............. B65G 23/44 |
| | | | | | 198/709 |
| 1,913,040 | A | * | 6/1933 | Pierson | ..................... F16H 7/14 |
| | | | | | 198/813 |
| 1,925,024 | A | * | 8/1933 | Slater | ..................... B65G 23/44 |
| | | | | | 198/816 |
| 2,413,265 | A | * | 12/1946 | Thompson | ............. B65G 23/44 |
| | | | | | 474/138 |

(Continued)

FOREIGN PATENT DOCUMENTS

| | | |
|---|---|---|
| CN | 203568330 U | 4/2014 |
| CN | 203728062 U | 7/2014 |

(Continued)

*Primary Examiner* — Mark A Deuble
(74) *Attorney, Agent, or Firm* — Dorsey & Whitney LLP

(57) ABSTRACT

An example external bearing system includes a base plate that, for example, is configured to be attached to or form part of a housing (e.g., the housing of a conveyor system). The base plate includes a front surface and a back surface. The base plate also defines a base elongated opening. The external bearing system further includes a bearing apparatus positioned adjacent to and attached (e.g., indirectly attached) to the base plate. The bearing apparatus is configured to have a shaft rotatably attached thereto. The bearing apparatus is configured to move along the elongated opening. The external bearing system further includes a plurality of moveable plates covering or configured to cover substantially all of the base elongated opening that is not occupied by the shaft regardless of a position of the bearing apparatus relative to the base elongated opening. One or more of the moveable plates are configured to move relative to the base plate as the bearing apparatus moves relative to the base plate.

20 Claims, 7 Drawing Sheets

(56) References Cited

U.S. PATENT DOCUMENTS

| | | | | | |
|---|---|---|---|---|---|
| 3,436,979 | A | * | 4/1969 | Molitor | B65G 23/44 |
| | | | | | 474/138 |
| 3,921,793 | A | * | 11/1975 | Hutchinson | B65G 23/44 |
| | | | | | 198/816 |
| 4,799,584 | A | * | 1/1989 | Hartsuiker | B65G 23/44 |
| | | | | | 198/813 |
| 5,143,207 | A | * | 9/1992 | Pruett | B65G 23/44 |
| | | | | | 198/814 |
| 5,749,659 | A | * | 5/1998 | Nisley | F16C 23/00 |
| | | | | | 384/247 |
| 2007/0267273 | A1 | * | 11/2007 | Walsh | B65G 21/14 |
| | | | | | 198/632 |
| 2014/0353128 | A1 | * | 12/2014 | Francisco | B65G 39/16 |
| | | | | | 198/813 |
| 2022/0307550 | A1 | | 9/2022 | Lang et al. | |

FOREIGN PATENT DOCUMENTS

| | | | |
|---|---|---|---|
| CN | 205058864 | U | 3/2016 |
| CN | 105692077 | A | 6/2016 |
| CN | 108443332 | A | 8/2018 |
| CN | 109618910 | A | 4/2019 |
| CN | 111153120 | A | 5/2020 |
| CN | 112049862 | A | 12/2020 |
| DE | 10351657 | A1 | 6/2005 |
| DE | 102007054180 | A1 | 5/2009 |

* cited by examiner

EXTERNAL BEARING SYSTEMS

CROSS-REFERENCE TO RELATED APPLICATION(S)

This application claims priority to U.S. Provisional Patent Application No. 63/491,842 filed on Mar. 23, 2023, the entire disclosure of which is incorporated herein, in its entirety, by this reference.

BACKGROUND

Many systems use bearing apparatuses. An example of such a system includes a conveyor system including a conveyor belt. The bearing apparatus of the conveyor system may be rotatably attached to a shaft and a belt may be disposed around the shaft.

During use, a medium may be disposed on and removed from the belt. As such, the conveyor system may be an at least partially open system thereby allowing the medium to be disposed on and removed from the conveyor belt.

SUMMARY

Embodiments are directed to external bearing systems, and methods and systems (e.g., conveyor systems) including the same. In an embodiment, an external bearing system is disclosed. The external bearing system includes a base plate having a front surface and a back surface. The base plate defines a base elongated opening. The external bearing system also includes a bearing apparatus configured to receive a shaft and move along the base elongated opening. The external bearing system also includes a plurality of moveable plates covering substantially all of the base elongated opening except for a portion configured to receive the shaft regardless of a position of the bearing apparatus relative to the base elongated opening.

In an embodiment, a conveyor system is disclosed. The conveyor system includes a housing defining an interior chamber and an input. The conveyor system also includes an external bearing system. The external bearing system includes a base plate having a front surface and a back surface. The base plate defines a base elongated opening. The base plate forms or is attached to a portion of the housing. The external bearing system also includes a bearing apparatus configured to receive a shaft and move along the base elongated opening. The external bearing system also includes a plurality of moveable plates covering substantially all of the base elongated opening except for a portion configured to receive the shaft regardless of a position of the bearing apparatus relative to the base elongated opening. The external bearing system further includes the shaft partially disposed in the interior chamber. The conveyor system also includes a conveyor belt at least partially disposed in the interior chamber. The conveyor belt is disposed on and extending around the shaft.

In an embodiment, a method of using a conveyor system is disclosed. The method includes providing the conveyor system. The conveyor system includes a housing defining an interior chamber and an input. The conveyor system also includes an external bearing system. The external bearing system includes a base plate having a front surface and a back surface. The base plate defines a base elongated opening. The base plate forms or is attached to a portion of the housing. The external bearing system also includes a bearing apparatus configured to receive a shaft and move along the base elongated opening. The external bearing system also includes a plurality of moveable plates covering substantially all of the base elongated opening except for a portion configured to receive the shaft regardless of a position of the bearing apparatus relative to the base elongated opening. The external bearing system further includes the shaft partially disposed in the interior chamber. The conveyor system also includes a conveyor belt at least partially disposed in the interior chamber. The conveyor belt is disposed on and extending around the shaft. The method also includes rotating the conveyor belt, wherein rotating the conveyor belt includes rotating the shaft attached to the bearing apparatus.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
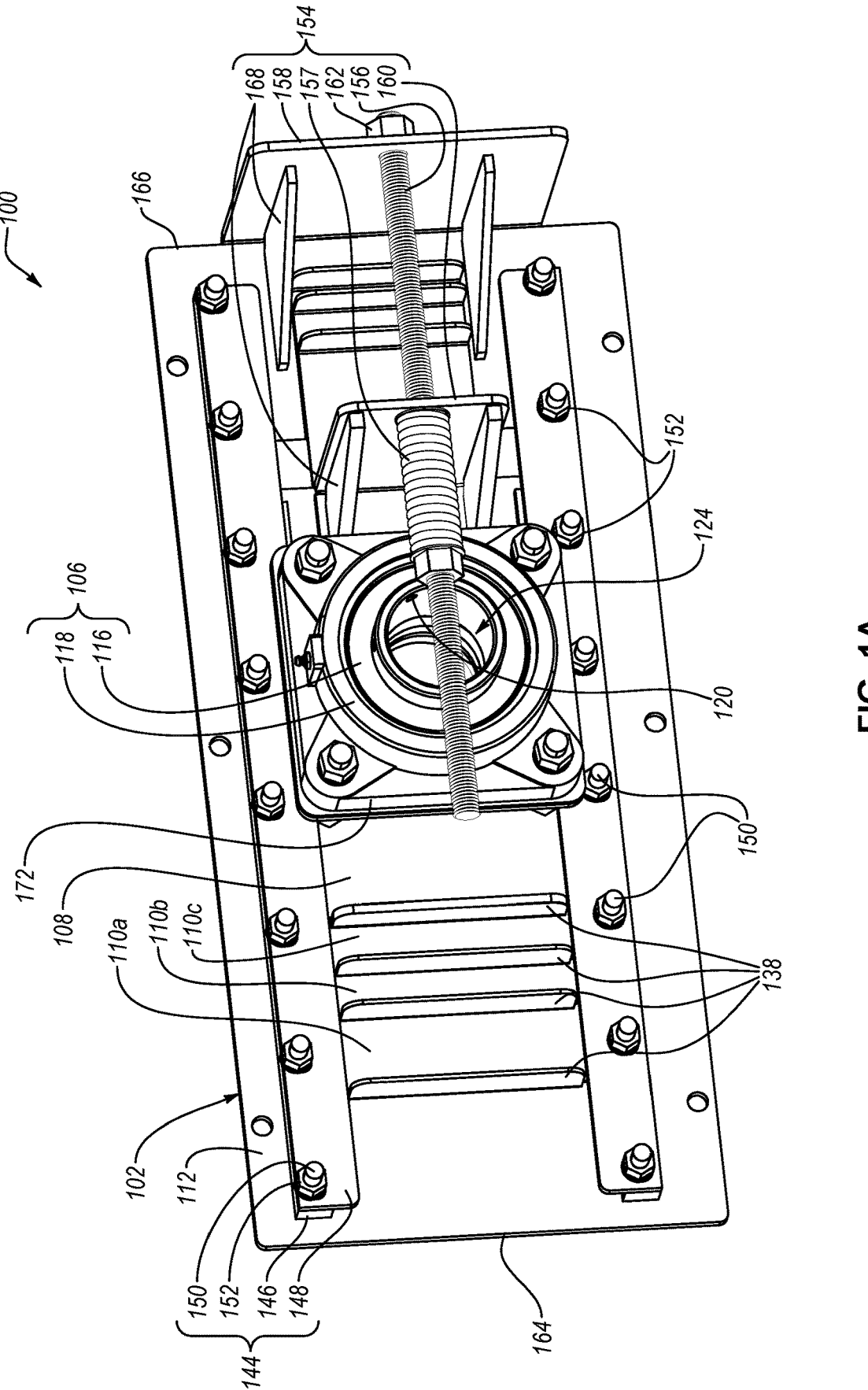
FIG. 1A is an isometric view of an external bearing system, according to an embodiment.

Embodiments are directed to external bearing systems, and methods and systems (e.g., conveyor systems) including the same. An example external bearing system includes a base plate that, for example, is configured to be attached to or form part of a housing (e.g., the housing of a conveyor system). The base plate includes a front surface and a back surface. The base plate also defines a base elongated opening. The external bearing system further includes a bearing apparatus positioned adjacent to and attached (e.g., indirectly attached) to the base plate. The bearing apparatus is configured to have a shaft rotatably attached thereto. The bearing apparatus is configured to move along the elongated opening. The external bearing system further includes a plurality of moveable plates covering or configured to cover substantially all of the base elongated opening that is not occupied by the shaft regardless of a position of the bearing apparatus relative to the base elongated opening. One or more of the moveable plates are configured to move relative to the base plate as the bearing apparatus moves relative to the base plate.

In an embodiment, as previously discussed, the external bearing system may form part of a conveyor system. The conveyor system includes a housing at least partially defining an interior region. The housing also at least partially defines at least one input that allows a material to be added into the interior region (e.g., onto a conveyor belt) and at least one output. The conveyor system may include a plurality of shafts at least partially disposed in the interior region and a conveyor belt disposed around and extending between the shafts. One of the shafts is rotatably attached to the bearing apparatus of the external bearing system. The external bearing system is positioned on the housing such that the bearing apparatus thereof is positioned on or adjacent to an exterior of the housing (i.e., the bearing apparatus is not positioned within the interior chamber). The shafts are configured to rotate thereby allowing the conveyor belt to rotate.

During use, a material may be disposed into the interior region of the housing through the input and onto the conveyor belt. The conveyor belt may move such that the material disposed thereon moves from the input to the output. In other words, the conveyor belt moves the material through at least a portion of the interior chamber of the housing. At least some of the material moving through the interior chamber may flow through regions of the interior chamber adjacent to the bearing apparatus.

The material flowing through the conveyor system (e.g., sand or water) may be abrasive, oxidative, or otherwise damage a bearing apparatus that receives a shaft of the conveyor system. As such, it is beneficial to isolate the bearing apparatus from the material to prevent damage to the bearing apparatus and maximize the life of the bearing apparatus. Conventional conveyor systems have difficulty isolating the bearing apparatus from the material. For example, the conveyor belts of conventional conveyor systems may stretch during use, especially when the conveyor belt is relatively new or nearing the end of its life span. The stretching of the conveyor belt causes the tension in the conveyor belt to decrease which, makes operating the conveyor belt less efficient and may cause premature failure of the conveyor belt. To accommodate stretching of the conveyor belt, a shaft may be moved to increase the tension of the conveyor belt such that the conveyor belt is maintained within a desired tension range. However, conventional conveyor systems have difficulty moving the shaft while also keeping the bearing apparatus isolated from the material flowing through the conveyor system.

The external bearing system disclosed herein and the conveyor systems including the same are an improvement over the conventional bearing apparatuses and conveyor systems. For example, the external bearing system disclosed herein includes a base plate defining a base elongated opening. The base elongated opening allows the shaft to extend from an interior chamber to an exterior of a housing where the bearing apparatus is located. The elongated opening also allows the shaft to move relative to the housing thereby allowing the conveyor system to be tightened. The external bearing system includes a plurality of moveable plates that are configured to cover the base elongated opening thereby preventing or at least inhibiting the material flowing in the interior of the housing from reaching the bearing apparatus. The plurality of moveable plates are configured to slide along the base plate such that the plurality of moveable plates continuously cover the base elongated opening as the shaft moves relative to the housing.

As an example, the external bearing systems disclosed herein are discussed in relationship with conveyor systems.

However, the external bearing systems disclosed may be used in other applications that includes shafts. In an embodiment, the external bearing systems disclosed herein may be used with water turbines. In such an embodiment, the plurality of moveable plates prevents or at least inhibits water from reaching and oxidizing the bearing apparatus while the external bearing system provides the option to move the turbine relative to a housing, for instance, depending on the fluid flow rate. In an embodiment, the external bearing systems disclosed herein may be used with a paper shredder or other type of mechanical shredder that includes rotatable teeth attached to a shaft. In such an embodiment, the plurality of moveable plates prevents or at least inhibits the shredded material from reaching the bearing apparatus while the external bearing system provides the option to move the shaft with teeth relative to a housing, for instance, to move the teeth closer together as the teeth wear. Other applications that the external bearing systems may be used with include, without limitation, pumps, treadmills, automobiles, fans, any shaft attached to a belt (e.g., vacuum cleaners), or any other devices that includes shafts.

Figure 1B:
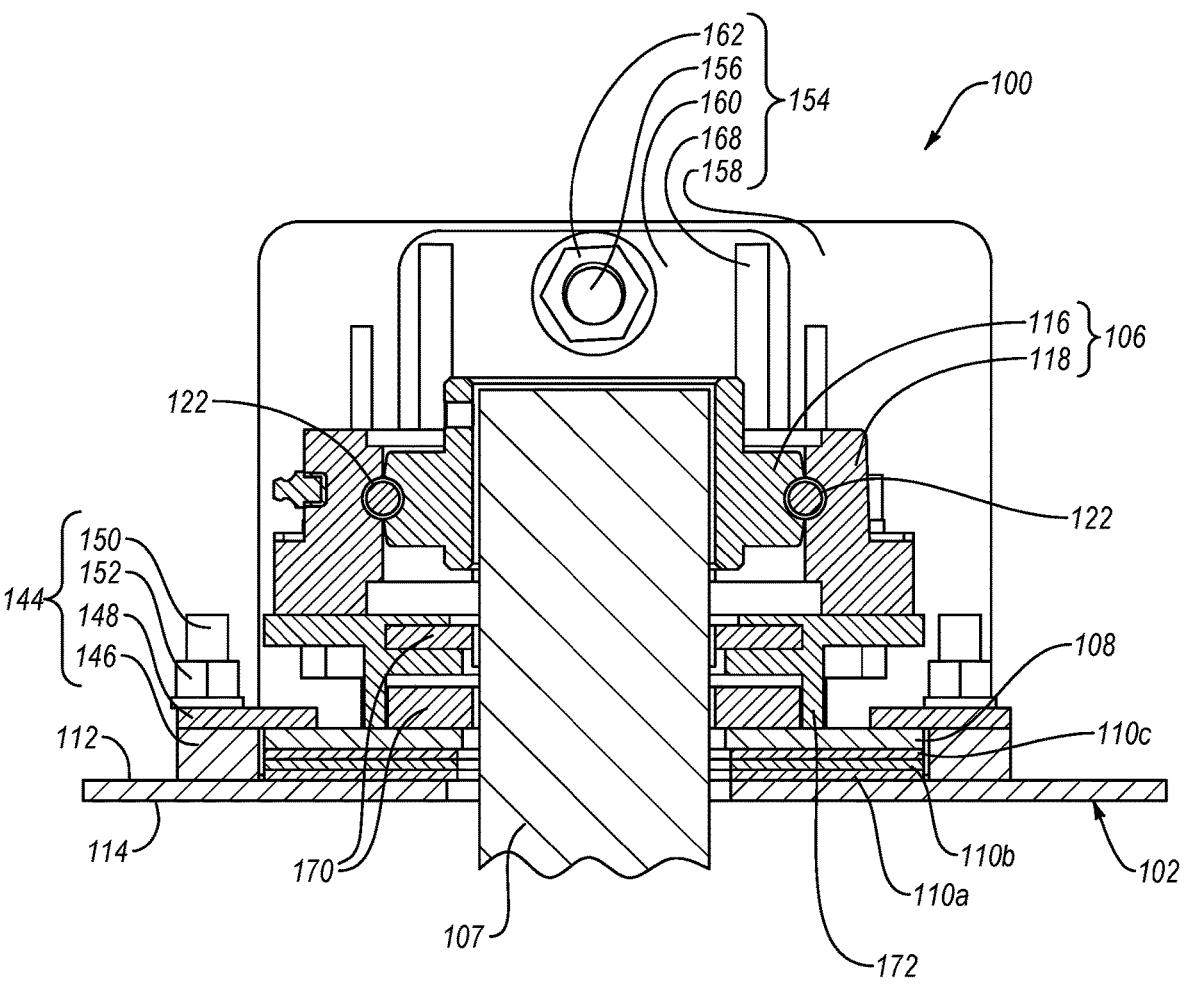
FIG. 1B is a cross-sectional view of the external bearing system taken along plane 1B-1B.
Figure 1C:
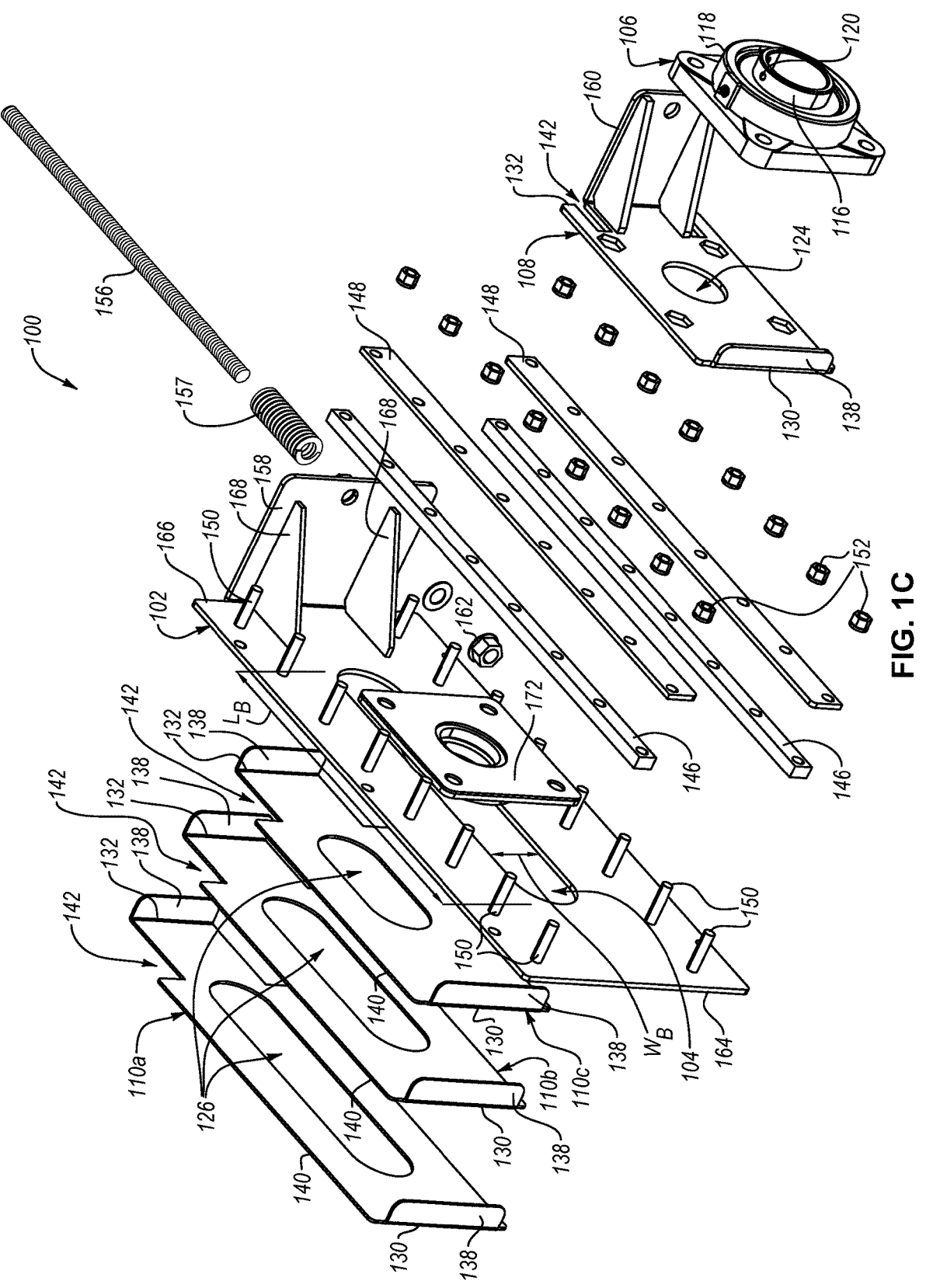
FIG. 1C is an exploded view of the external bearing system. The external bearing system includes a base plate defining a base elongated opening.

FIG. 1A is an isometric view of an external bearing system 100, according to an embodiment. FIG. 1B is a cross-sectional view of the external bearing system 100 taken along plane 1B-1B. FIG. 1C is an exploded view of the external bearing system 100. The external bearing system 100 includes a base plate 102 defining a base elongated opening 104. The external bearing system 100 further includes a bearing apparatus 106 positioned adjacent to and attached (e.g., indirectly attached) to the base plate 102. The bearing apparatus 106 is configured to have a shaft 107 (shown in FIG. 1B) rotatably attached thereto. The bearing apparatus 106 is configured to move relative to the base plate 102 and the base elongated opening 104 thereby also allowing the shaft 107 to move relative to the base plate 102 and the base elongated opening 104. The external bearing system 100 further includes a plurality of moveable plates (e.g., bearing apparatus plate 108 and covering plates 110a, 110b, 110c) covering or configured to cover substantially all of the base elongated opening 104 that is not occupied by the shaft 107 regardless of a position of the bearing apparatus 106 relative to the base elongated opening 104.

Figure 4:
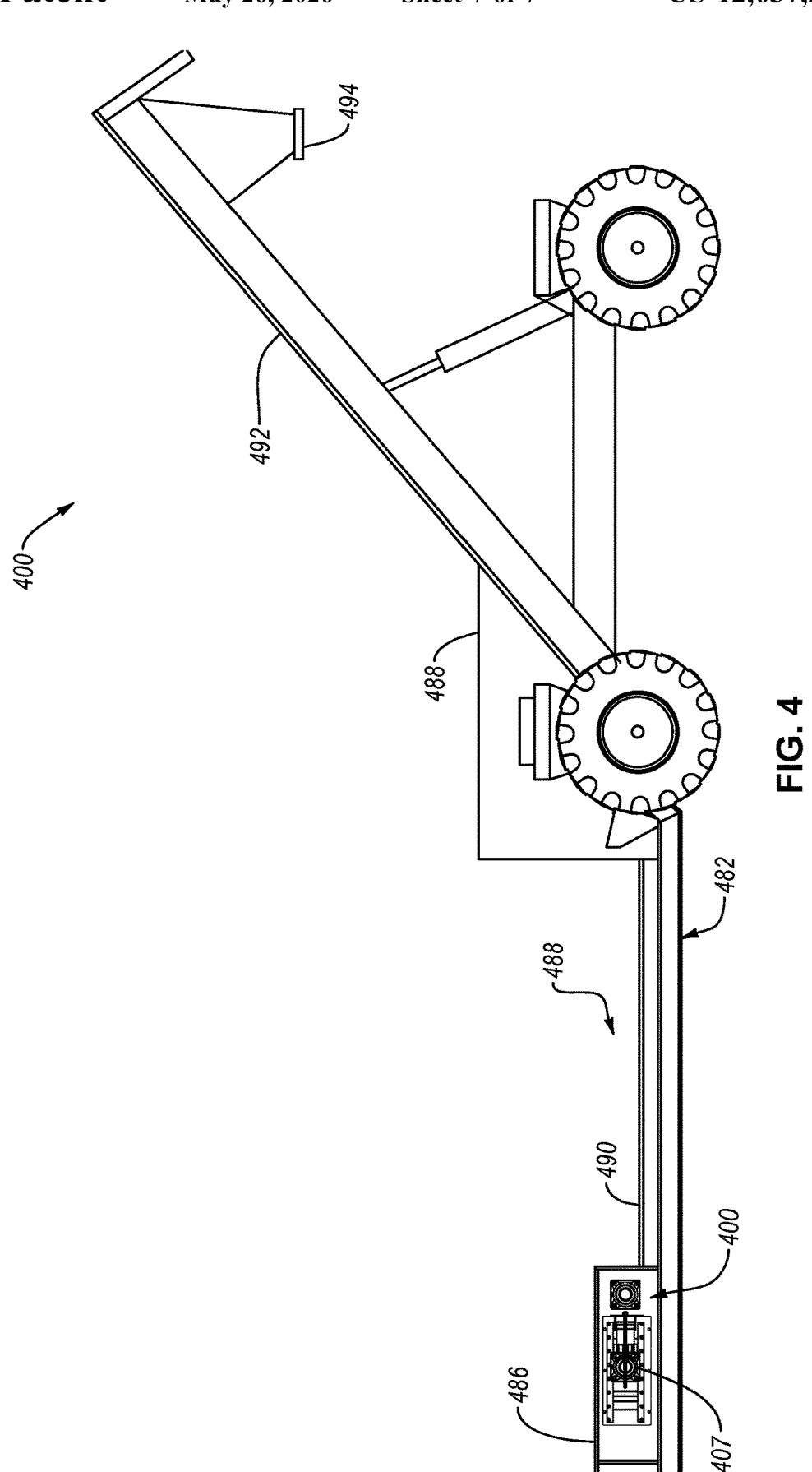
FIG. 4 is an isometric view of the bulk material conveyor system that includes an external bearing system, according to an embodiment.

The base plate 102 is configured to be fixedly attached to or form part of a housing (e.g., the housing 482 shown in FIG. 4). The base plate 102 includes a front surface 112 and a back surface 114. When the base plate 102 is attached to or forms part of the housing, the front surface 112 faces away from the housing such that the front surface 112 faces an exterior region that is not defined or enclosed by the housing. Meanwhile, when the base plate 102 is attached to or forms part of housing, the back surface 114 faces towards the interior of the housing. In an embodiment, at least a portion of the back surface 114 of the base plate 102 defines a portion of an interior of the housing when the base plate 102 is attached to or forms part of the housing. In such an embodiment, the back surface 114 of the base plate 102 may be exposed to a material disposed in and flowing through the interior of the housing.

The base plate 102 may be formed from any suitable material. As previously discussed, the base plate 102 may be exposed to the material disposed in and flowing through the interior of the housing. The material of the base plate 102 may be selected based on the material that is flowing through the interior of the housing. In an embodiment, the base plate 102 may be formed from an abrasion resistant material (e.g., steel, another metal, or a ceramic) or coated with an abrasion resistant coating when the material flowing through the interior of the housing is an abrasive material, such as sand. In an embodiment, the base plate 102 may be formed from an oxidation resistant material (e.g., stainless steel) or coated with an oxidative resistant coating when the material flowing through the interior of the housing is an oxidizing material, such as water or fertilizer.

The base plate 102 defines the base elongated opening 104. The base elongated opening 104 allows a shaft 107 to extend through the base plate 102 which, in turn, allows the shaft 107 to extend from an interior of the housing to the bearing apparatus 106, which is located external to the housing. The base elongated opening 104 is larger than the shaft 107 thereby allowing the shaft 107 to pass therethrough. For example, the base elongated opening 104 may exhibit a width $W_B$ is equal to or, more preferably, slightly greater than the shaft 107 such that the base plate 102 is unlikely to contact the shaft 107 and resist rotation of the shaft 107. The base elongated opening 104 also exhibits a length $L_B$ that is significantly larger than the shaft 107. The relatively large length $L_B$ of the base elongated opening 104 allows the shaft 107 to move relative to the base plate 102, for example, thereby allowing the shaft 107 to tighten or loosen the conveyor belt as needed. Allowing the shaft 107 to move relative to the base plate 102 also allows the bearing apparatus 106 to move relative to the base plate 102 since the bearing apparatus 106 is attached to the shaft 107.

The bearing apparatus 106 is positioned to be external to the housing. In other words, the front surface 112 of the base plate 102 generally faces the bearing apparatus 106. As such, the position of the bearing apparatus 106 allows the bearing apparatus 106 to be isolated or at least substantially isolated from a material disposed within the housing.

The bearing apparatus 106 may include any bearing apparatus that may be attached to the shaft 107. In an embodiment, the bearing apparatus 106 includes a radial bearing apparatus. The radial bearing apparatus includes an inner radial bearing assembly 116 and an outer radial bearing assembly 118 configured to receive the inner radial bearing assembly 116. The inner radial bearing assembly 116 may be configured to rotate relative to the outer radial bearing assembly 118. The inner radial bearing assembly 116 may be configured to receive a shaft 107.

In an embodiment, the inner radial bearing assembly 116 may be fixedly attached to the shaft 107. In an example, the inner radial bearing assembly 116 is configured to be fixedly attached to the shaft 107 using at least one bolt (not shown so the hole 120 may be illustrated). In such an embodiment, the inner radial bearing assembly 116 defines at least one hole 120 (e.g., threaded hole) configured to receive the bolt 119. The bolt 119 received in the hole 120 may press against the shaft 107 or may be received into a hole defined by the shaft 107 thereby fixedly attaching the shaft 107 to the inner bearing assembly 116. In an example, the inner bearing assembly 116 is fixedly attached to the shaft 107 using an interference fit between the inner bearing assembly 116 and the shaft 107, an adhesive between the inner bearing assembly 116 and the shaft 107, or using any other suitable technique.

It is noted that the bearing apparatus 106 may include a bearing apparatus other than or in addition to the radial bearing apparatus shown in FIGS. 1A-1C. In an example, the bearing apparatus 106 only includes the outer radial bearing assembly 118. In such an example, the shaft 107 itself may form an inner bearing assembly that rotates relative to the outer bearing assembly 118. In an example, the bearing apparatus 106 may include a thrust-bearing apparatus configured to prevent the shaft 107 shifting along a longitudinal axis of the shaft 107. In an example, the bearing apparatus 106 may include a combination thrust-bearing radial bearing apparatus, a bearing apparatus including a conically shaped assembly and another bearing assembly configured to receive the conically shaped bearing assembly, or any other suitable bearing apparatus. Regardless of the type of bearing apparatus 106, at least a portion of the bearing apparatus 106 is configured to receive the shaft 107.

In an embodiment, the bearing apparatus 106 may be a ball bearing apparatus. In such an embodiment, the bearing apparatus 106 includes a plurality of balls 122. The balls 122 are configured to roll between the bearing assemblies of the bearing apparatus 106 thereby preventing or at least inhibiting friction between the bearing assemblies. The bearing assemblies of the bearing apparatus 106 may also define recesses that collectively receive the balls 122. The recesses secure the balls 122 between the bearing assemblies. Also, when the bearing apparatus 106 is a radial bearing apparatus, the recesses with the balls 122 therein prevent the inner and outer bearing assemblies 116, 118 from shifting in a direction that is parallel to a longitudinal axis of the shaft 107 effectively causing the radial bearing apparatus to also function as a thrust bearing apparatus. It is noted that the bearing apparatus 106 may include one or more rolling bearing elements other than or in addition to the balls 122, such as cylinders. In an embodiment, the bearing apparatus 106 may include sliding bearing elements, tilting pad bearing elements, or any other type of bearing elements instead of or in addition to the balls 122 or other rolling bearing elements.

The bearing apparatus 106 may be formed from any suitable material. In an embodiment, the surfaces of the bearing apparatus 106 that bearing against each other may be formed from abrasion resistant and/or wear resistant material(s), such as hardened steel, polycrystalline diamond, or other ceramics. However, since the bearing apparatus 106 is external to the housing, it is noted that the bearing apparatus 106 may be formed from soft, non-abrasive resistant materials (e.g., steel, zinc, zinc-based materials, copper, or aluminum) since the bearing apparatus 106 is unlikely to be exposed to the material disposed in the housing.

As previously discussed, the external bearing system 100 includes a plurality of moveable plates that are configured to cover the base elongated opening 104 of the base plate 102 as the bearing apparatus 106 and the shaft 107 move relative to the base plate 102. Thus, the plurality of moveable plates may prevent or at least inhibit the material in the housing from reaching the bearing apparatus 106. The plurality of moveable plates are configured to move relative to each other and the base plate 102 thereby allowing the bearing apparatus 106 and the shaft 107 to move relative to the base plate 102. The plurality of moveable plates include a bearing apparatus plate 108 and one or more covering plates (e.g., first covering plate 110a, second covering plate 110b, and third covering plate 110c).

The bearing apparatus plate 108 is configured to be fixedly attached, either directly or indirectly, to the bearing apparatus 106. The bearing apparatus plate 108 defines a shaft opening 124 configured to receive the shaft 107. The shaft opening 124 may exhibit a size and shape that generally corresponds to the size and shape of the shaft 107, thereby preventing or at least inhibiting the material within the housing from reaching the bearing apparatus 106 through the shaft opening 124.

As previously discussed, the external bearing system 100 includes a plurality of covering plates. The covering plates are positioned between the base plate 102 and the bearing apparatus plate 108. In an embodiment, the covering plates may be positioned between the front surface 112 of the base plate 102 and the bearing apparatus plate 108. Positioning the covering plates between the front surface 112 and the bearing apparatus plate 108 minimizes the surface area of the covering plates that are exposed to the material flowing through the housing which, in turn, minimizes wear, oxidation, or other damage to the covering plates caused by the material. However, it is noted that the covering plates may be positioned adjacent to the back surface 114. In the illustrated embodiment, the covering plates includes (from the base plate 102 to the bearing apparatus plate 108) the first covering plate 110a, the second covering plate 110b, and the third covering plate 110c. For brevity and clarity, the discussion provided below may refer to these three covering plates. However, as discussed in more detail below, the covering plates may include a single covering plate, two covering plates, or four or more covering plates.

Each of the moveable plates includes an initial edge 130 and an opposing edge 132. Each of the moveable plates exhibits a length measured from the initial edge 130 to the opposing edge 132 along a direction that is parallel to a longitudinal axis of the longest covering plate. In an embodiment, each of the moveable plates exhibit a different length. Generally, the length of each moveable plate decreases with increasing distance from the base plate 102. For example, as illustrated, the first covering plate 110a may exhibit a length that is greater than the second covering plate 110a, the second covering plate 110c may exhibit a length that is greater than the third covering plate 110c, and the third covering plate 110c may exhibit a length that is greater than the bearing apparatus plate 108. It is also noted that the moveable plates may exhibit a length that is less than a length of the base plate 102, wherein the length of the base plate 102 is measured parallel to the length of the covering plates. As will be discussed in more detail below, the different lengths of the moveable plates may help cover the base elongated opening 104 and/or prevent the moveable plates from sliding off each other. In an embodiment, the lengths of at least some of the moveable plates are the same.

Each of the covering plates also define a covering elongated opening 126 between the initial and opposing edges 130, 132. The covering elongated openings 126 are larger than the shaft 107 thereby allowing the shaft 107 to pass through the covering plates while also preventing or minimizing friction between the covering plates and the shaft 107. The elongated shape of the covering elongated openings 126 also allows the shaft 107 to move relative to the covering elongated openings 126. Each of the covering elongated openings 126 of the covering plates exhibits a length measured along a direction that is parallel to a longitudinal axis of the longest covering plate. In an embodiment, each of the covering elongated openings 126 exhibit a different length. Generally, the length of each covering elongated opening 126 decreases with increasing distance from the base plate 102. For example, as illustrated, the covering elongated opening 126 of the first covering plate 110a may exhibit a length that is greater than the covering elongated opening 126 of the second covering plate 110b and the covering elongated opening 126 of the second covering plate 110b may exhibit a length that is greater than the covering elongated opening 126 of the third covering plate 110c. It is noted that the covering elongated openings 126 may each exhibit a length that is greater than the length of the shaft opening 124 of the bearing apparatus plate 108, wherein the length of the shaft opening 124 is measured parallel to the length of the covering plates. It is also noted that the covering elongated openings 126 may each exhibit a length that is less than a length of the base elongated opening 104, wherein the length of the base elongated opening 104 is measured parallel to the length of the covering elongated openings 126. The different lengths of the base elongated opening 104, the shaft opening 124, and the covering elongated openings 126 prevent or at least inhibit the material in the housing from reaching the bearing apparatus 106 through these openings.

Figure 1D:
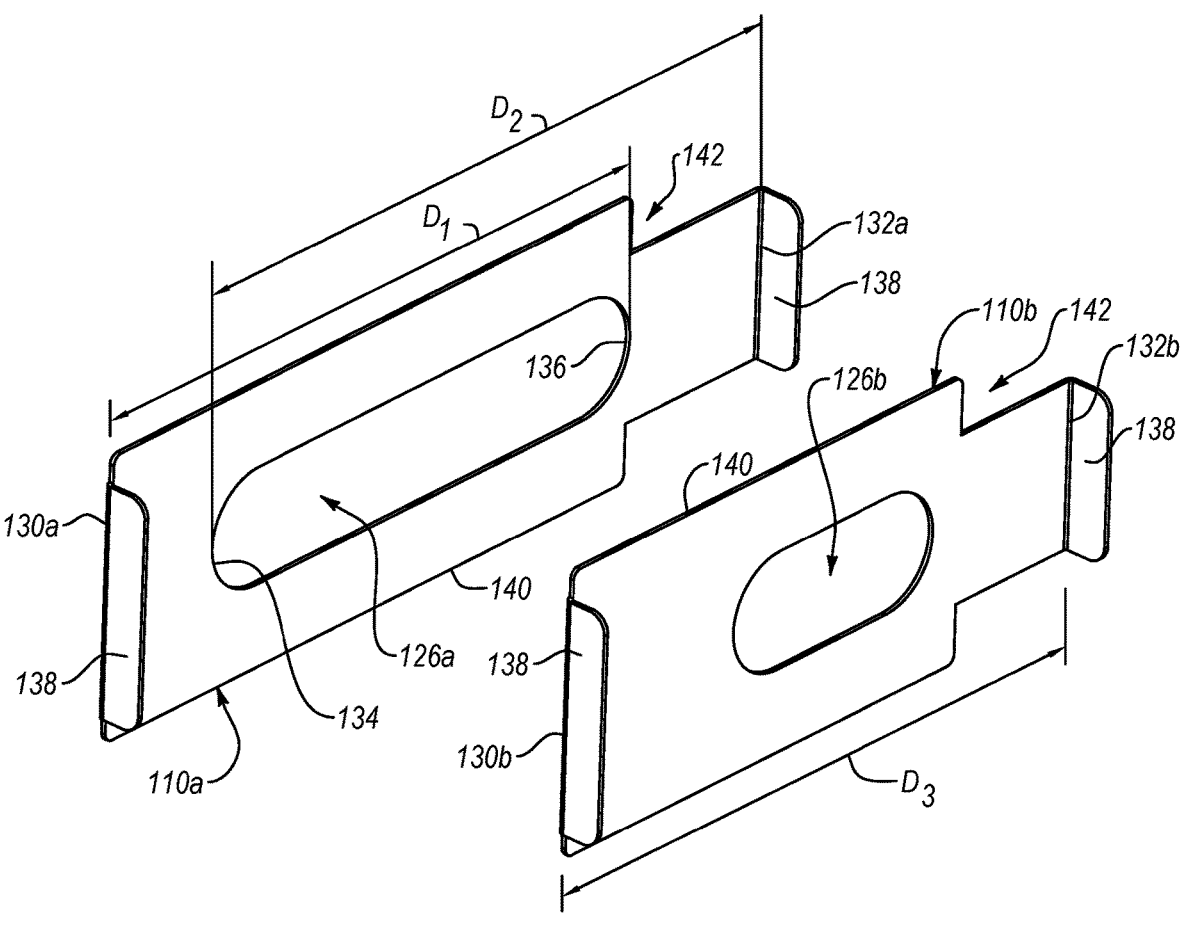
FIG. 1D is an exploded view of the external bearing system that only shows the first covering plate and the second covering plate.

The size of the base elongated opening 104 and the elongated openings 126 are selected based on the size of the moveable plate immediately above it (i.e., positioned further from the base plate 102) such that the moveable plate(s) always cover the elongated opening of the plate(s) beneath it. In particular, the distance from the initial edge 130 to an opposing edge of the elongated opening 126 (e.g., the edge of the elongated opening 126 closest to the opposing edge 132) and the distance from the opposing edge 132 to an opposing edge of the elongated opening 126 (e.g., the edge of the elongated opening 126 closest to the initial edge 130) is selected to be smaller than the distance between the initial edge 130 and the opposing edge 132 of the plate thereabove. This is illustrated in FIG. 1D, which is an exploded view of the external bearing system 100 that only shows the first covering plate 110a and the second covering plate 110b. As shown in FIG. 1D, the first covering plate 110a includes a first initial edge 130a and a first opposing edge 132a. The first covering plate 110a also defines a first elongated opening 126a having an initial opening edge 134 and an opposing opening edge 136 opposite the initial opening edge 134. The initial opening edge 134 is the edge of the first elongated opening 126a closest to the first initial edge 130a and the opposing opening edge 136 is the edge of the first elongated opening 126a that is closest to the first opposing edge 132a. The first covering plate 110a exhibits a first distance $D_1$ and a second distance $D_2$. The first distance $D_1$ is measured from the first initial edge 130a to the opposing opening edge 136 and the second distance $D_2$ is measured from the first opposing edge 132a to the initial opening edge 134. The second covering plate 110b includes a second initial edge 130b and a second opposing edge 132b opposite the second initial edge 130b. The second covering plate 110b also exhibits a third distance $D_3$ measured between the second initial edge 130b and the second opposing edge 132b. In other words, the third distance $D_3$ is the length of the second covering plate 110b. The second covering plate 110b also defines a second elongated opening 126b. The first distance $D_1$ and the second distance $D_2$ are less than the third distance $D_3$. This relationship between the first and second distances $D_1$, $D_2$ and the third distance $D_3$ causes the first elongated opening 126a to always be covered by the second covering plate 110b and the second elongated opening 126b so long as the second covering plate 110b does not overhang the first covering plate 110a. Generally, the first and second distances $D_1$, $D_2$ are equal which allows the first elongated opening 126a to be centrally located. However, it is noted that the first and second distances $D_1$, $D_2$ may be different.

The relationship between the first and second distances $D_1$, $D_2$ and the third distance $D_3$ may apply to the other moveable plates and base plate 102 of the external bearing system 100. For example, the length of the first covering plate 110a may be greater than the distances of the base plate 102 that correspond to the first and second distanced $D_1$, $D_2$ (i.e., the distance from one edge of the base plate 102 to an opposing opening edge). Further, the length of the third covering plate 110c is greater than the distances of the second covering plate 110*b* that correspond to the first and second distances $D_1$, $D_2$ and the length of the bearing apparatus plate 108 may be greater than the distances of the third covering plate 110*c* that correspond to the first and second distances $D_1$, $D_2$.

Referring back to FIGS. 1A-1C, in an embodiment, at least some of the moveable plates may include a wall 138 extending from one or more of the initial edge 130 or the opposing edge 132 thereof. These walls 138 maintain the moveable plates above each other. In other words, the walls 138 prevent a moveable plate from extending past (i.e., overhanging) the moveable plate below it. Allowing a moveable plate to extend past a moveable plate below it may prevent the moveable plates from covering the elongate openings 104 therebelow even when the first and second distances of a moveable plate closer to the base plate 102 is less than the third distance of the moveable plate further from the base plate 102, as discussed above with regards to FIG. 1D.

Each of the moveable plates includes longitudinal edges 140 extending between the initial and opposing edges 130, 132. The longitudinal edges 140 are edges of the moveable plates that extend generally parallel to a longitudinal axis of the longest moveable plate. The wall 138 may be spaced from the longitudinal edges 140. For example, the wall 138 may not extend along an entire length of the initial and opposing edges 130, 132 thereby allowing the wall 138 to be spaced from the longitudinal edges 140. As discussed in more detail below, the moveable plates may be clamped to the base plate 102 along the longitudinal edges 140 thereof. The wall 138 may be spaced from the longitudinal edges 140 by a distance that is equal to or greater than the distance that the clamp overhands the moveable plates which, in turn, prevents the wall 138 from interfering with the operation of the clamp.

The external bearing system 100 may include any number of moveable plates. For example, the external bearing system 100 may include a single moveable plate (e.g., only includes the bearing apparatus plate 108) or may include the bearing apparatus plate 108 and one or more covering plates. The one or more covering plates may include 1, 2, 3, 4, 5, 6, 7, 8, 9, 10, or more than 10 covering plates.

In an embodiment, the number of moveable plates of the external bearing system 100 may be selected based on the desired size (e.g., length) of the external bearing system 100. For example, if the external bearing system 100 only includes a single moveable plate, the single moveable plate may need to exhibit a length that is about two times greater than the base elongated opening 104 of bearing apparatus plate 108 to cover the base elongated opening 104 regardless of the position of shaft 107 in the base elongated opening 104. In such an example, the external bearing system 100 may exhibit a length that is at least equal to the length of the single moveable plate. However, if the external bearing system 100 included two moveable plates, the overall length of the external bearing system 100 may be significantly reduced compared to the external bearing apparatus that includes only a single moveable plate. Further, the external bearing system 100 including three or more moveable plates may exhibit a length that is less than the external bearing system 100 including two moveable plates, and so forth. In other words, the size or length external bearing system 100 depends, in part, on the number of moveable plates are included in the external bearing system 100.

The overall size external bearing system 100 may be important consideration depending on the application of external bearing system 100. In an example, the external bearing system 100 may form part of conveyor system configured to receive sand or other bulk material from a train car. In such an example, the conveyor system may need to fit over the train tracks and between structures adjacent to the train tracks, such as other train tracks, a loading dock, a road, or a station. The size of the conveyor system depends in part on the size of the external bearing system 100. Decreasing the size of the external bearing system 100 by including more moveable plates in the external bearing system 100 allows the conveyor system to fit in the narrow space between the train track and the adjacent structures. In another example, the external bearing system 100 may form part of the conveyor system configured to be disposed in a warehouse. Due to the limited size of the warehouse, it may be desirable to have the conveyor system be as small as possible. Again, decreasing the size of the external bearing system 100 by increasing the number of moveable plates in the external bearing system 100 allows the size of the conveyor system to also be reduced.

In an embodiment, one or more of the moveable plates may define at least one cutout 142. The cutout 142 decreases the weight of the moveable plates which, in turn, facilitates fixedly clamping the moveable plates to the base plate 102. The cutout 142 may allow the moveable plates to fit within certain spaces, such as the spaces between the support structure 168 of the first adjustment wall 158.

The external bearing system 100 includes a securement device 144 configured to secure the moveable plates to the base plate 102. The securement device 144 may include any suitable device that may secure the moveable plates to the base plate 102 so long as the securement device 144 allows the moveable plates to move relative to the base plate 102 in at least some circumstances, as will be discussed in more detail below.

In an embodiment, as shown, the securement device 144 includes at least one clamp. The clamp is configured to secure the moveable plates to the base plate 102. The clamp is configured to selectively switch between a first state and a second state. The force applied to from the clamp to the moveable plates may be greater when the clamp is in the first state than when the clamp is in the second state. When the clamp is in the first state, the force applied from the clamp to the moveable plates substantially fixedly (i.e., substantially non-moveably) attaches the moveable plates to the base plate 102. When the clamp is in the second state, the force applied from the clamp to the moveable plates is sufficiently small (e.g., zero) that the moveable plates are able to move using the adjustment system 154. In other words, the clamp may substantially prevent and allow movement of the moveable plates when the clamp is in the first state and the second state.

The clamp may include a spacer 146 and an overhanging plate 148. The spacer 146 is positioned between the overhanging plate 148 and the base plate 102 such that the overhanging plate 148 is spaced from the base plate 102. Collectively, the spacer 146 and the overhanging plate 148 exhibit a generally L-shaped cross-sectional shape. The generally L-cross-sectional shape of the spacer 146 and the overhanging plate 148 allows the spacer 146 and the overhanging plate 148 to clamp against the moveable plates. For example, the spacer 146 exhibits a thickness that is comparable (e.g., equal to or slightly smaller) than the collective thickness of the moveable plates. The thickness of the spacer 146 causes the overhanging plate 148 to be generally level with the topmost moveable plate (e.g., the bearing apparatus plate 108). The overhanging plate 148 overhangs the spacer 146 such that the overhanging plate 148 contacts at least one of the moveable plates.

The spacer 146 and the overhanging plate 148 are configured to switch between the first and second states, as discussed above. In an embodiment, the spacer 146 and the overhanging plate 148 are configured to be attached to the base plate 102 using a plurality of bolts 150 and nuts 152. In such an embodiment, the bolts 150 may be attached to or integrally formed with the base plate 102. The spacer 146 and the overhanging plate 148 may exhibit the first state when the nuts 152 are fully tightened (e.g., a torque of 10 m·N to 100 m·N, about 50 m·N to about 500 m·N, or greater than about 250 m·N is applied to the nuts 152) which causes the overhanging plate 148 to press against the moveable plates. In other words, the moveable plates may be clamped between the base plate 102 and the overhanging plate 148 when the nuts 152 are fully tightened. The spacer 146 and the overhanging plate 148 may exhibit the second state when the nuts 152 are loosened (i.e., not fully tightened). When the nuts 152 are not fully tightened, a gap may exist between the moveable plates and the overhanging plate 148 or the static and kinetic friction between the moveable plates and the overhanging plate 148 is negligible which allows the moveable plates and, by extension, the bearing apparatus 106 to freely move relative to the base plate 102.

In an embodiment, as illustrated, the spacer 146 and the overhanging plate 148 are distinct pieces. In such an embodiment, the spacer 146 and/or the overhanging plate 148 may be replaced when one or more of the moveable plates are changed or replaced thereby changing the collective thickness of the moveable plates. In an embodiment, the spacer 146 and the overhanging plate 148 are integrally formed together which may facilitate assembling the external bearing system 100 by decreasing the number of parts of the external bearing system 100.

It is noted that the clamp may include a structure other than the spacer 146 and the overhanging plate 148. For example, the clamp may include a toggle clamp, a holdfast attached to the base plate 102, another type of clamp (e.g., bar clamp or c-clamp) attached to or integrally formed with the base plate 102, or any other type of clamp.

In an embodiment, the securement device 144 may include a guiderail. The guiderail may be substantially similar to the clamp illustrated in FIGS. 1A-1C and discussed above except that the spacer 146 exhibits a thickness that is equal to or, more preferably, slightly greater than the collectively thickness of the moveable plates. For example, the thickness of the spacer 146 may be greater than the collective thickness of the moveable plates by about 1 mm or less, more preferably about 0.5 mm or less, about 0.25 mm or less, or about 0.1 mm or less. The guiderail may allow the moveable plates to move without having to loosen the bolts 150. Instead, the overhanging plate 148 merely maintains the moveable plates adjacent to the base plate 102 and minimizes or prevents the formation of gaps between the moveable plates. When the securement device 144 includes a guiderail, the position of the moveable plates and/or the bearing apparatus 106 may be maintained by the adjustment system 154.

In an embodiment, the external bearing system 100 may include two securement devices 144. In such an embodiment, one of the securement devices 144 may interact with one longitudinal edge 140 of the moveable plates and the other securement device 144 may interact with the opposing longitudinal edge 140 of the moveable plates. The two securement devices 144 may better secure the moveable plates and the bearing apparatus 106 to the base plate 102 than if the external bearing system 100 included only one securement device 144.

The external bearing system 100 may include an adjustment system 154 configured to move the bearing apparatus 106, the shaft 107, and the moveable plates, for example, when the clamp is in the first state. In other words, the adjustment system 154 may be used to adjust the position of the bearing apparatus 106, the shaft 107, and the moveable plates relative to the base plate 102. In the illustrated embodiment, this adjustment system 154 includes an elongated arm 156 (e.g., an at least partially threaded bolt), a first adjustment wall 158 extending from or near an edge of the base plate 102, and a second adjustment wall 160 extending from the bearing apparatus plate 108. The elongated arm 156 may extend between and past the first and second adjustment walls 158, 160. The adjustment system 154 may include at least one nut 162, such as two nuts 162. The nut(s) 162 may press against, either directly or indirectly (e.g., via the spring 157) the first and second adjustment walls 158, 160 such that tightening or loosening one or more of the nut(s) 162 may cause/allow the bearing apparatus plate 108 to move closer to or further from the first adjustment wall 158, respectively. Moving the bearing apparatus plate 108 closer or further from the first adjustment wall 158 may move the bearing apparatus 106, the shaft 107, and one or more of the moveable plates closer or further away from the first adjustment wall 158. In other words, the nuts 162 may cause the first and second adjustment walls 158, 160 to increase or decrease a distance therebetween. It is noted that one of the nuts 162 may be omitted, for example, when one end of the elongated arm 156 is welded, otherwise attached to, or integrally formed with (i.e., exhibit singe piece construction with) at least partially of one of the first adjustment wall 158 or the second adjustment wall 160.

The elongated arm 156 may exhibit any suitable length and/or diameter, depending on the size of the external bearing system 100, the length of the base elongated opening 104, the number of plates included in the external bearing system 100, and the expected maximum load applied to the shaft 107. In an example, the elongated arm 156 may exhibit a length measured parallel to longitudinal axis thereof that is about 7.5 cm or greater, about 10 cm or greater, about 12.5 cm or greater, about 15 cm or greater, about 17.5 cm or greater about 20 cm or greater, about 25 cm or greater, about 30 cm or greater, about 35 cm or greater, about 40 cm or greater, about 50 cm or greater, about 60 cm or greater, about 70 cm or greater, about 80 cm or greater, about 90 cm or greater, about 100 cm or greater, about 125 cm or greater, about 150 cm or greater, about 175 cm or greater, about 200 cm or greater, or in ranges of about 7.5 cm to about 12.5 cm, about 10 cm to about 15 cm, about 12.5 cm to about 17.5 cm, about 15 cm to about 20 cm, about 17.5 cm to about 25 cm, about 20 cm to about 30 cm, about 25 cm to about 35 cm, about 30 cm to about 40 cm, about 35 cm to about 50 cm, about 40 cm to about 60 cm, about 50 cm to about 70 cm, about 60 cm to about 80 cm, about 70 cm to about 90 cm, about 80 cm to about 100 cm, about 90 cm to about 125 cm, about 100 cm to about 150 cm, about 1125 cm to about 175 cm, or about 150 cm to about 200 cm. It is noted that, in some embodiments, the elongated arm 156 may exhibit a length of about 7.5 cm or less. In an example, the elongated arm 156 may exhibit a diameter that is about 1 cm to about 1.5 cm, about 1.25 cm to about 1.75 cm, about 1.5 cm to about 2 cm, about 1.75 cm to about 2.25 cm, about 2 cm to about 2.5 cm, about 2.25 cm to about 2.75 cm, about 2.5 cm to about 3 cm, about 2.75 cm to about 3.25 cm, about 3 cm to about 3.5 cm, about 3.25 cm to about 3.75 cm, about 3.5 cm to about 4 cm, about 3.75 cm to about 4.5 cm, about 4 cm to about 5 cm, or greater than about 5 cm. It is noted that, in some embodiments, the elongated air 156 may exhibit a diameter of about 1 cm or less.

The elongated arm 156 may include any suitable type of threaded screw. In an embodiment, the elongated arm 156 may include ACME threads since ACME threads are currently believed to better accommodate the loads applied thereto without failing or otherwise decreasing the life span of the elongated arm 156 than if the elongated arm 156 included UNC threads or UNF threads, especially when the elongated arm 156 exhibits of relatively small diameter (e.g., a diameter that is less than 2.5 cm). In an embodiment, the elongated arm 156 may include UNC threads, UNF threads, or any other type of thread.

The base plate 102 includes a proximal side 164 and an opposing distal side 166. A force applied to the shaft 107 during use wants to move the shaft 107 towards the proximal side 164 of the base plate 102. For example, when the external bearing system 100 forms part of a conveyor system, the conveyor belt may extend from the shaft 107 towards the proximal side 164. In an embodiment, as shown, the first adjustment wall 158 and the second adjustment wall 160 may extend from a portion of the base plate 102 and the bearing apparatus plate 108, respectively, that are between the shaft 107 and distal side 166. In such an embodiment, one of the nuts 162 is position on the side of the first adjustment wall 158 that faces away from the proximal side 164 and the other nut 162 is position on the side of the second adjustment wall 160 that faces towards the proximal side 164. Such positions of the nuts 162 allows the nuts 162 to control the position of the bearing apparatus 106, the shaft 107, and the moveable plates relative to the base plate 102. It is noted that the position of the nuts 162 relative to the first adjustment wall 158 and the second adjustment wall 160 may change depending on whether the first adjustment wall 158 and/or second adjustment wall 160 are between the shaft 107 and the proximal side 164. For example, when the first adjustment wall 158 and the second adjustment wall 160 are between the shaft 107 and proximal side 164, one nut 162 may be positioned adjacent to a surface of the first adjustment wall 158 that faces the distal side 166 and the other nut 162 may be positioned adjacent to a surface of the second adjustment wall 160 that faces the proximal wall 164.

In an embodiment, one or both of the first adjustment wall 158 and the second adjustment wall 160 may include one or more support structures 168 (e.g., two support structures 168, as shown). The support structures 168 are configured to prevent or inhibit bending of the first adjustment wall 158 and/or the second adjustment wall 160 towards the base plate 102 when a load is applied to the shaft 107. In an example, the support structures 168 may be plates (e.g., generally triangular plates) that generally extend perpendicularly to the base plate 102, the first adjustment wall 158, and the second adjustment wall 160. When the first adjustment wall 158 includes the support structure 168, the support structure 168 may extend from the base plate 102 to the first adjustment wall 158. When the second adjustment wall 160 includes the support structure 168, the support structure 168 may extend from the bearing apparatus plate 108 to the second adjustment wall 160. As previously discussed, one or more of the moveable plates of the external bearing system 100 may define a cutout 142 to allow the moveable plates to fit between the support structures 168.

In an embodiment, the external bearing system 100 includes a spring 157 on the elongated arm 156. The spring

157 may be positioned between the second adjustment wall 160 and the adjacent nut 162. The spring 157 may allow for minor adjustments of the position of the bearing apparatus 106 relative to the base plate 102 when different loads are applied to the shaft 107. Such minor adjustments may minimize large sudden changes in the forces applied to the bearing apparatus 106, the shaft 107, and anything attached to the shaft 107 (e.g., a conveyor belt) that may damage these components. The spring 157 may also be used to measure a load applied to the shaft 107, as will be discussed in more detail with regards to FIG. 3.

The spring 157 may exhibit a maximum length when no loads are applied thereto. The maximum length may be about 5 cm to about 7 cm, about 6 cm to about 8 cm, about 7 cm to about 9 cm, about 8 cm to about 10 cm, about 9 cm to about 11 cm, about 10 cm to about 12 cm, about 11 cm to about 13 cm, about 12 cm to about 14 cm, about 13 cm to about 15 cm, about 14 cm to about 16 cm, about 15 cm to about 17 cm, about 16 cm about 18 cm, about 17 cm to about 19 cm, about 18 cm to about 20 years, or greater than about 20 cm. The length of the spring 157 may be selected based on the stiffness of the spring 157 and the amount of movement in the shaft 107 that is permitted during use. For example, the length of the spring 157 may be increased when the stiffness of the spring 157 is increased or the distance that the shaft 107 is permitted to move is increased.

It is noted that the external bearing system 100 may include a resilient element other than or in addition to the spring 157 (e.g., compression spring). For example, the external bearing system 100 may include a rubber stopper, torsion springs, disk springs, variable rate springs, flat spring, gas springs, electromagnetic spring, or any other resilient element.

In an embodiment, the external bearing system 100 may include one or more sealing elements figure to prevent the material adjacent back surface 114 of the base plate 102 moving through gaps between the moveable plates. In an example, the external bearing system 100 may include grease between at least some of the moveable plates of the external bearing system 100. The grease may be positioned between at least one of the base plate 102 and the adjacent covering plate, between the adjacent covering plates, or between the bearing apparatus plate 108 and the adjacent covering plate. The grease may at least partially occupy any gaps or channels between the moveable plates through which the material may flow. In an example, the external bearing system 100 does not include grease between the moveable plates thereof, for instance, when contamination of the material with the grease is undesirable (e.g., the material is a fertilizer or is a food-grade material, such as corn). In such an example, the external bearing system 100 may not include a sealing element between the moveable plates that prevents flow of the material between the moveable plates or includes a non-grease sealing element between the moveable plates. Examples of non-grease sealing elements include fabric, a compressible polymeric material film, or silicone spray.

In an embodiment, the external bearing system 100 may include one or more sealing elements configured to prevent or at least inhibit the material adjacent to the back surface 114 of the base plate 102 from moving along the shaft 107. In an example, as shown, the sealing element may include one or more felt seals 170 (e.g., high density felt seals). The felt seals 170 are configured to contact and be compressed against the shaft 107 such that the material is unable or at least inhibited from moving along the shaft 107. The sealing element may include a single felt seal 170 or a plurality of felt seals 170 (as shown). The sealing element may include the felt seals 170 since felt seals 170 inhibit movement of the material along the shaft 107, are able to compress around the shaft 107, and exhibit negligible friction against the shaft 107. That said, the sealing element may include one or more structures other than or in addition to the felt seals 170. For example the sealing elements may include an O-ring or a lip seal.

The external bearing system 100 may include a housing 172 configured to hold the sealing element and maintain the sealing element against the shaft 107. The housing 172 may have any suitable position on the external bearing system 100 so long as the sealing element is positioned between the bearing apparatus 106 and the interior of the housing. For instance, as shown, the housing 172 may be positioned between the bearing apparatus 106 and the bearing apparatus plate 108. In such an instance, the housing 172 may be attached to (e.g., distinct from) or integrally formed with the bearing apparatus 106 and/or the bearing apparatus plate 108. In other words, the bearing apparatus 106 may be indirectly attached to the bearing apparatus plate 108 when the housing 172 is position between the bearing apparatus 106 and the bearing apparatus plate 108. In another instance, the housing 172 may be positioned adjacent to the back surface 114 of the base plate 102. In such an instance, the housing 172 may be exposed to the material thereby increasing wear on the housing 172.

The external bearing system 100 may include one or more structures or elements other than what is shown in FIGS. 1A-1D. For example, the external bearing system 100 may include a motor attached to the shaft (e.g., directly attached to the shaft 107 or indirectly attached to the shaft, or instance, via a belt) that is configured to rotate the shaft 107.

Figure 2:
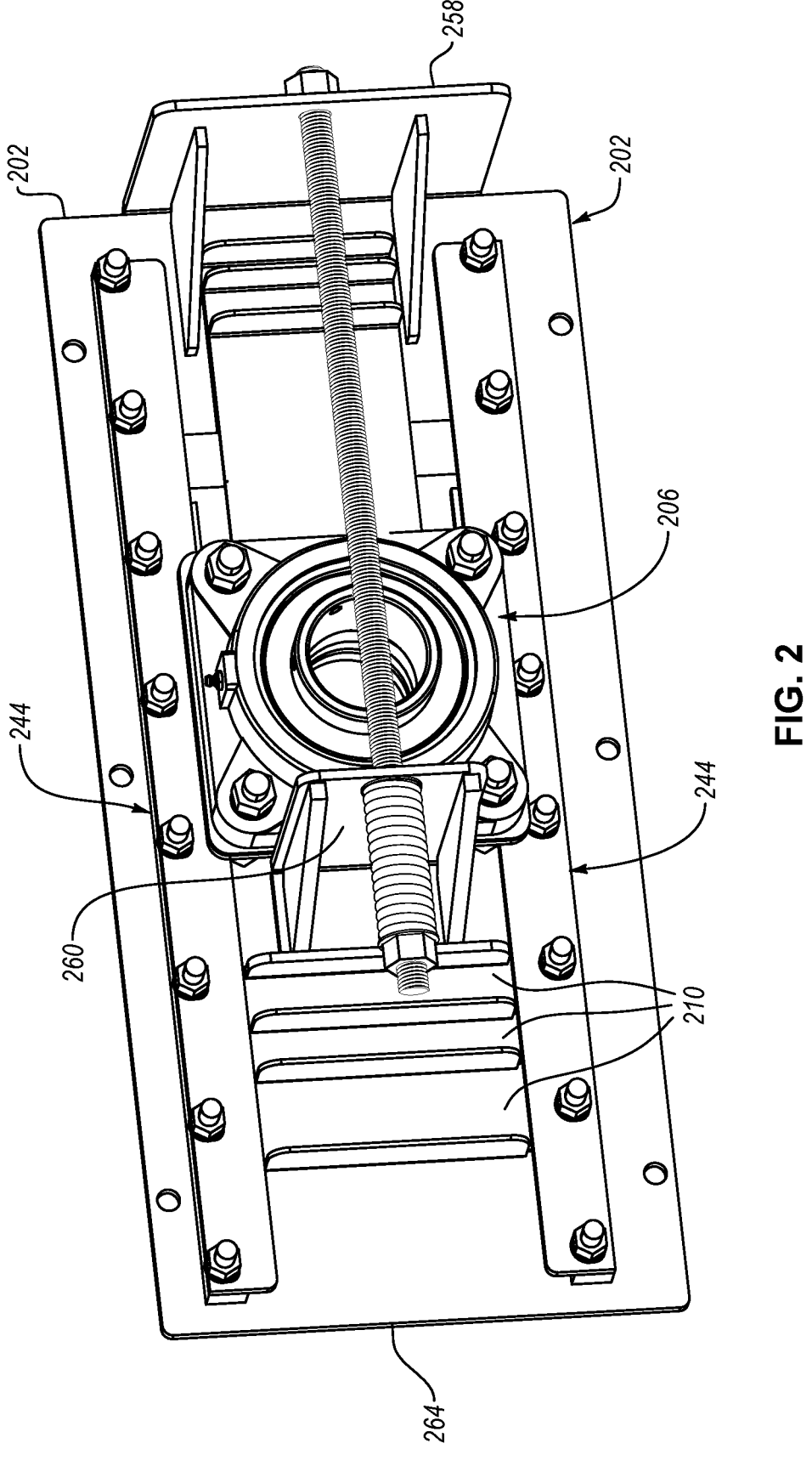
FIG. 2 is an isometric view of an external bearing system, according to an embodiment.

The external bearing systems disclosed herein may exhibit arrangements other than the arrangement illustrated in FIGS. 1A-1D. For example, FIG. 2 is an isometric view of an external bearing system 200, according to an embodiment. Except as otherwise disclosed herein, the external bearing system 200 is the same as or substantially similar to any of the external bearing systems disclosed. For instance, the external bearing system 200 may include a plate 202, a bearing apparatus 206, one or more covering plates 210, a securement system 244, and an adjustment system 254.

The adjustment system 254 includes an elongated arm 256, a first adjustment wall 258, and a second adjustment wall 260. Similar to the securement device 144 shown in FIGS. 1A-1C, the first adjustment wall 258 is positioned between the bearing apparatus 206 and the distal side 266 of the base plate 202 or positioned on the distal side 266. The second adjustment wall 260 is position between the bearing apparatus 206 and the proximal side 264 of the base plate 202. In other words, the first and second adjustment walls 258, 260 are positioned on opposite sides of the bearing apparatus 206. The position of the first and second adjustment walls 258, 260 causes the elongated arm 256 to extend over the bearing apparatus 206. Allowing the elongated arm 256 to extend across the bearing apparatus 206 may decrease the size of the external bearing system 200 than if the first and second adjustment walls 258, 260 are positioned on the same side of the bearing apparatus 206. However, extending the elongated arm 256 across the bearing apparatus 206 may prevent the shaft from extending out of the bearing apparatus 206 and may make removing the shaft from the bearing apparatus 206 (e.g., to replace or repair the shaft) more difficult than if the first and second adjustment walls 258, 260 are positioned on the same side of the bearing apparatus 206.

It is noted that the position of the first and second adjustment walls 258, 260 may be reversed. In other words the first adjustment wall 258 may be positioned between the bearing apparatus 206 and the proximal side 264 of the base plate 202 or positioned on the proximal side 264. The second adjustment wall 260 may be positioned between the bearing apparatus 206 and the distal side 266 of the base plate 202. Such an arrangement of the first and second adjustment walls 258, 260 similarly causes the elongated arm 256 to extend across the bearing apparatus 206.

The securement devices of the external bearing systems disclosed herein may be used to measure, either quantitatively or qualitatively, the load applied to the shaft. In particular, the securement devices disclosed herein may measure the load applied thereto which, in turn, corresponds to the load applied to the shaft. When the external bearing system forms part of a conveyor system, the conveyor belt may extend around and from the shaft. The load applied to the shaft depends on the tension of the conveyor belt. Measuring the load applied to the shaft using the securement devices allows the tension of the conveyor belt to be indirectly measured. For instance, the securement device may determine that the load applied to the shaft is below a desired or threshold value which, in turn, indicates that the tension in the conveyor belt is below a desired or threshold value. The securement device may then be used to move the shaft relative to the base plate to increase the load applied to the shaft, or in other words, increase the tension of the conveyor belt. Referring to the adjustment system 154 shown in FIGS. 1A-1C, the securement device 144 moves the shaft 107 relative to the base plate 102 by twisting one or more of the nuts 162 to move the first and second adjustment walls 158, 160 closer together thereby increasing the load applied to the shaft 107 and the tension in the conveyor belt. Similarly the securement device may determine that the load applied to the shaft is above a desired or threshold value which, in turn, indicates that the tension in the conveyor belt is above a desired or threshold value. The securement device may then be used to move the shaft relative to the base plate to decrease the load applied to the shaft or, in other words, decrease the tension in the conveyor belt. Referring to the adjustment system 154 shown in FIGS. 1A-1C, the securement device 144 moves the shaft 107 relative to the base plate 102 by twisting one or more of the nuts 162 to move the first and second adjustment walls 158, 160 further apart thereby decreasing the load applied to the shaft 107 and decreasing the tension of the conveyor belt.

Figure 3:
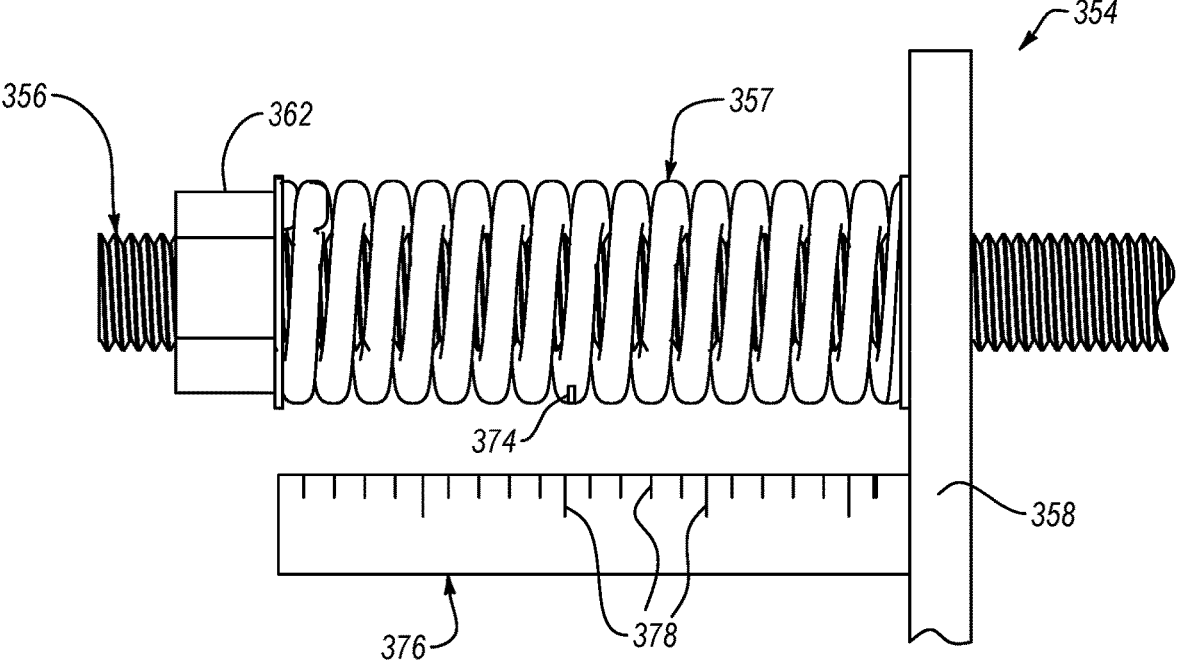
FIG. 3 is a side view of a securement device that is configured to measure a load applied to a shaft (not shown), according to an embodiment.

The securement devices of the external bearing systems disclosed herein may measure the load applied to the shaft using any suitable technique. FIG. 3 is a side view of a securement device 354 that is configured to measure a load applied to a shaft (not shown), according to an embodiment. Except as otherwise disclosed herein, the securement device 354 may be the same as or substantially similar to any of the securement devices disclosed herein. For example, the securement device 354 may include an elongated arm 356, a spring 357, an adjustment wall 358, and one or more nuts 362. The spring 357 may be positioned between and abut the adjustment wall 358 and the nut 362.

The spring 357 may be used to determine the load applied to the shaft because the compression of the spring 357 corresponds to the load applied to the shaft. In an embodiment, as shown, the spring 357 includes a spring marking 374 (e.g., notch or painted line). The securement device 354 also includes a scale 376 adjacent to the spring 357. For example, the scale 376 may extend from the adjustment wall 358 and be positioned adjacent to the spring 357. The scale 376 includes one or more scale markings 378 formed thereon. The scale markings 378 may include any suitable marking, such as a plurality of lines (as shown) or a color gradient. The spring marking 374 and the scale 376 are, collectively, configured to indicate the load applied to the shaft. In particular, the position of the spring marking 374 relative to the scale 376 indicates the load applied to the shaft. For instance, the spring marking 374 will move relative to the scale 376 as the load applied to the shaft changes because changing the load applied to the shaft also changes the compression of the spring 357. In an embodiment, the spring marking 374 may be omitted. In such an embodiment, the position of the edge of the spring 357 (or another portion of the spring 357) relative to the scale 376 may be used to indicate the load applied to the shaft.

In an example, the spring marking 274 and the scale 376 are configured to quantitatively indicate the load applied to the shaft or, similarly, the load applied to the spring 357. In such an example, the scale markings 378 formed on the scale may quantitatively indicate the load applied to the shaft and or the spring 357 when the spring marking 374 is adjacent to the scale marking 378. In an example, the spring marking 374 and the scale 376 are configured to qualitatively indicate the load applied to the shaft and or the spring 357. In such an example, the scale markings 378 of the scale 376 they include a region indicating that the load applied to the shaft and/or the spring 357 is within a desired or threshold range when the spring marking 374 is adjacent to said region of the scale 376.

In an embodiment, the scale 376 may be omitted from the adjustment system 354. In such an embodiment, the adjustment system 354 may still be used to determine the load applied to the shaft and/or the spring 357. In an example, the load applied to the shaft and or the spring 357 may be determined by measuring the length of the spring 357 between the adjustment wall 358 and the nut 362. In such an example, a data table may be provided which indicates the relationship between the load applied to the shaft and/or the spring 357 and the length of the spring 357. In an example, the load applied to the shaft and/or the spring 357 may be at or above a desired or threshold value if the spring 357 is completely compressed. In other words, the spring 357 is selected such that a load required to completely compress the spring 357 is substantially equal to the desired or threshold load applied to the shaft (when taking friction between the moveable components of the external bearing system into account). The completely compressed spring 357 may be unable to indicate whether the load applied to the shaft and/or the spring 357 is greater than the desired or threshold load. As such, care should be exercised when using the adjustment system 354 such that movement between the adjustment walls of the adjustment system 354 stops the moment the spring 357 is completely compressed to prevent the load applied to the shaft and/or the spring 357 being greater than the desired or threshold load.

As previously discussed, the external bearing systems disclosed here in may formed part of a larger system. In a particular embodiment, the external bearing systems disclosed herein may be used in a bulk material conveyor system though, as previously discussed, the external bearing systems disclosed herein may be used in other systems. FIG. 4 is an isometric view of the bulk material conveyor system 480 that includes an external bearing system 400, according to an embodiment. Except as otherwise disclosed herein, the external bearing system 400 may be the same as or substantially similar to any of the external bearing systems disclosed.

The conveyor system 480 includes a housing 482 defining an interior region. The housing 482 may include a forward section 484, the back section 486 opposite the forward section 484, and an inlet for 488 between the forward section 484 and the back section 486. The conveyor system 480 includes a conveyor belt 490 that extends from the forward section 484, across the inlet 488, and to the back section 486. As such, the conveyor system 480 they receive a bulk material (e.g., sand, fertilizer, corn, or salt) at the inlet 488 and the conveyor belt 490 can move the bulk material from the inlet 488 to the forward section 484. The housing 482 may also include a chute 492 defining an outlet 494. The conveyor system 480 may be configured to move the bulk material that is received in forward section 484 up the chute 492 and out the outlet 494. For example, the conveyor belt 490 or a separate conveyor belt (not shown) may extend along the chute 492 thereby allowing the bulk material received in the forward section 484 to move up the chute 492 and out the outlet 494.

The particular arrangement of the conveyor system 480 shown in FIG. 4 may allow the bulk material to be dispensed from a first container (e.g., a covered hopper rail car, gondola rail car, open hopper rail car, end dump trailer, side dump trailer, bottom dump trailer, stationary hopper, etc.) into the inlet 488, for instance, using gravity. The conveyor system 480 then moves the bulk material to a second container that is different from and, optionally, space from the first container.

The external bearing system 400 located at any location on the housing 482. For example, as shown, the external bearing system 400 located on back section 486 of the housing 482. However external bearing system 400 may be located on the forward section 484 and/or the chute 492 instead of or in addition to the back section 486. In a particular example, the external bearing system 400 may be spaced from the motor of the conveyor system 480 that moves the conveyor belt 490. In such an example, as illustrated, the external bearing system 400 may be located on back section 486 of the housing 482 whereas the motor may be located on the forward section 484. The motor may be attached or otherwise configured to rotate a shaft that is different than the shaft 407 attached to the external bearing system 400. In an example, as previously discussed, the motor may form part of the external bearing system 400 or may be otherwise configured to rotate the shaft 407 attached to the external bearing system 400.

FIG. 4 merely illustrates one side of the conveyor system. In an embodiment, the opposing side of the shaft 407 that is attached to the external bearing system 400 is attached to an additional external bearing system (not shown). The additional external bearing system may be the same as any of the external bearing systems disclosed herein. The additional external bearing system is rotatably attached to the opposing side of the shaft 407 and, thus, the external bearing system 400 and the additional external bearing system provide support to both sides of the shaft 407. The additional external bearing system may also be configured to prevent the bulk material from reaching the bearing apparatus of the additional external bearing system. In an embodiment, the opposing side of the shaft 407 is attached to a motor or bearing apparatus that is different from the external bearing systems disclosed herein.

As the material moves through the conveyor system 480, the external bearing system 400 prevents the material from reaching the bearing apparatuses 406 of the external bearing system 400. For example, some of the material that is received through the inlet 488 may reach the back surface of the base of the external bearing system 400. External bearing system 400 prevents or at least inhibits the bulk material from reaching the bearing apparatus of the external bearing system hundred thereby prolonging the life of the bearing apparatus.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. An external bearing system, comprising:
a base plate having a front surface and a back surface, the base plate defining a base elongated opening;
a bearing apparatus configured to receive a shaft and move along the base elongated opening; and
a plurality of moveable plates covering substantially all of the base elongated opening except for a portion configured to receive the shaft regardless of a position of the bearing apparatus relative to the base elongated opening, wherein the plurality of movable plates includes:
    a bearing apparatus plate defining a shaft opening configured to receive the shaft, the shaft opening exhibiting a size and shape that substantially corresponds to a size and shape of the shaft; and
    a plurality of covering plates that each define a covering elongated opening.

2. The external bearing system of claim 1, further comprising the shaft rotatably attached to the bearing apparatus.

3. The external bearing system of claim 1, wherein the bearing apparatus includes an inner radial bearing assembly and an outer radial bearing assembly, the shaft attached to the inner radial bearing assembly.

4. The external bearing system of claim 1, wherein the bearing apparatus substantially prevents movement of the shaft along a longitudinal axis of the shaft relative to the base plate.

5. The external bearing system of claim 1, wherein the covering elongated opening of each of the plurality of covering plates exhibit a different length.

6. The external bearing system of claim 1, wherein the plurality of covering plates includes:
a first covering plate defining a first covering elongated opening, the first covering elongated opening exhibiting a first length; and
a second covering plate defining a second covering elongated opening, the second covering elongated opening exhibiting a second length that is less than the first length;
wherein the first covering plate is position closer to the base plate than the second covering plate.

7. The external bearing system of claim 1, wherein the plurality of covering plates includes:

a first covering plate defining a first covering elongated opening, the first covering plate exhibits a first initial edge and a first opposing edge, the first covering elongated opening including an initial opening edge closest to the first initial edge and an opposing opening edge closest to the first opposing edge, the first covering plate exhibiting a first distance measured from at least one of the first initial edge to the opposing opening edge or the first opposing edge to the initial opening edge;
a second covering plate defining a second covering elongated opening, the second covering plate exhibits a second initial edge and a second opposing edge, the second covering plate exhibiting a second distance measured between the second initial edge and the second opposing edge;
wherein the first distance is less than a second distance.

8. The external bearing system of claim 1, wherein the plurality of covering plates are positioned between the bearing apparatus and the base plate.

9. The external bearing system of claim 1, wherein at least one of the plurality of covering plates includes one or more walls extending from an edge thereof.

10. The external bearing system of claim 1, wherein the plurality of moveable plates are positioned between the base plate and the bearing apparatus.

11. The external bearing system of claim 1, further comprising at least one clamp that is configured to selectively switch between a first state and a second state, wherein the plurality of moveable plates are unable to move relative to the base plate when the clamp is in the first state and the plurality of moveable plates are able to move relative to the base plate when the clamp is in the second state.

12. The external bearing system of claim 11, the clamp includes a spacer exhibiting a thickness that generally corresponds to a collective thickness of the plurality of moveable plates and an overhanging plate, wherein the spacer is positioned between the base plate and the overhanging plate and a portion of the overhanging plate extends over the plurality of plates.

13. The external bearing system of claim 1, wherein:
the base plate includes a first adjustment wall extending therefrom;
one of the plurality of moveable plates includes a second adjustment wall extending therefrom; and
further comprising an elongated arm, at least a portion of the elongated arm extending between and attached to the first adjustment wall and the second adjustment wall, the elongated arm configured to change a distance between the first adjustment wall and the second adjustment wall.

14. The external bearing system of claim 13, wherein the elongated arm includes a threaded portion; and
further comprising at least one nut disposed on the threaded portion of the elongated arm, the nut attached to or pressing against, either directly or indirectly, one of the first adjustment wall or the second adjustment wall, and wherein rotating the at least one nut relative to the elongated arm increases or decreases the distance between the first wall and the second wall.

15. The external bearing system of claim 13, further comprising a spring disposed on the elongated arm, the spring pressing against one of the first adjustment wall or the second adjustment wall.

16. The external bearing system of claim 15, wherein at least one of:

the spring is fully compressed when a desired load is applied to the shaft; or the spring includes a spring marking thereon and the external bearing system further comprises a scale adjacent to the spring, the spring marking and the scale collectively configured to qualitatively or quantitatively indicate a load applied to the shaft.

17. The external bearing system of claim 13, wherein the first adjustment wall and the second adjustment wall are on one side of the shaft.

18. The external bearing system of claim 13, wherein the first adjustment wall is on one side of the shaft and the second adjustment wall is on an opposite side of the shaft.

19. A conveyor system, comprising:

a housing defining an interior chamber and an input;

an external bearing system including:

a base plate having a front surface and a back surface, the base plate defining an base elongated opening, the base plate forming or attached to a portion of the housing;

a bearing apparatus configured to receive a shaft and move along the base elongated opening; and a plurality of moveable plates covering substantially all of the base elongated opening except for a portion configured to receive the shaft regardless of a position of the bearing apparatus relative to the base elongated opening, wherein the plurality of movable plates includes:

a bearing apparatus plate defining a shaft opening configured to receive the shaft, the shaft opening exhibiting a size and shape that substantially corresponds to a size and shape of the shaft; and a plurality of covering plates that each define a covering elongated opening;

the shaft partially disposed in the interior chamber; and a conveyor belt at least partially disposed in the interior chamber, the conveyor belt disposed on and extending around the shaft.

20. A method of using a conveyor system, the method comprising:

providing the conveyor system, the conveyor system including:

a housing defining an interior chamber and an input;

an external bearing system including:

a base plate having a front surface and a back surface, the base plate defining an base elongated opening, the base plate forming or attached to a portion of the housing;

a bearing apparatus configured to move along the base elongated opening;

a shaft rotatably attached to the bearing apparatus and extending through the base elongated opening, the shaft partially disposed in the interior chamber; and a plurality of moveable plates covering substantially all of the base elongated opening except for a portion configured to receive the shaft regardless of a position of the bearing apparatus relative to the base elongated opening, wherein the plurality of movable plates includes:

a bearing apparatus plate defining a shaft opening configured to receive the shaft, the shaft opening exhibiting a size and shape that substantially corresponds to a size and shape of the shaft; and a plurality of covering plates that each define a covering elongated opening; and a conveyor belt at least partially disposed in the interior chamber, the conveyor belt disposed on and extending around the shaft; and rotating the conveyor belt, wherein rotating the conveyor belt includes rotating the shaft attached to the bearing apparatus.

\* \* \* \* \*